(12) United States Patent
Shibuya (10) Patent No.: US 11,326,071 B2
(45) Date of Patent: *May 10, 2022

(54) COATING MATERIAL AND SOLIDIFIED BODY OF COATING MATERIAL

(71) Applicant: NEC CORPORATION, Tokyo (JP)

(72) Inventor: Akinobu Shibuya, Tokyo (JP)

(73) Assignee: NEC CORPORATION, Tokyo (JP)

( * ) Notice: Subject to any disclaimer, the term of this patent is extended or adjusted under 35 U.S.C. 154(b) by 426 days.

This patent is subject to a terminal disclaimer.

(21) Appl. No.: 16/466,690

(22) PCT Filed: Oct. 19, 2017

(86) PCT No.: PCT/JP2017/037779
§ 371 (c)(1),
(2) Date: Jun. 5, 2019

(87) PCT Pub. No.: WO2018/105243
PCT Pub. Date: Jun. 14, 2018

(65) Prior Publication Data
US 2021/0284860 A1    Sep. 16, 2021

(30) Foreign Application Priority Data
Dec. 7, 2016  (JP) ................ JP2016-23766

(51) Int. Cl.
*C09D 127/12* (2006.01)
*C09D 7/61* (2018.01)
(Continued)

(52) U.S. Cl.
CPC ......... *C09D 127/12* (2013.01); *C09D 7/61* (2018.01); *C09D 7/69* (2018.01); *C08K 2003/2227* (2013.01); *C08K 2201/005* (2013.01)

(58) Field of Classification Search
CPC .................. C09D 7/61; C08K 2003/221
See application file for complete search history.

(56) References Cited

U.S. PATENT DOCUMENTS

| 6,200,918 B1 | 3/2001 | Yanagitani et al. |
| 10,392,309 B2 * | 8/2019 | Watanabe ............... C04B 35/64 |

(Continued)

FOREIGN PATENT DOCUMENTS

| CN | 106007791 A | * 10/2016 |
| JP | 11-255559 A | 9/1999 |

(Continued)

OTHER PUBLICATIONS

International Search Report for PCT/JP2017/037779, dated Dec. 19, 2017.

*Primary Examiner* — Vickey Nerangis
(74) *Attorney, Agent, or Firm* — Sughrue Mion, PLLC (57) ABSTRACT

A coating material includes a ceramic particle and binder. The ceramic particle includes a compound represented by a compositional formula of any of $A_aR_bAl_cO_4$, $A_aR_bGa_cO_4$, $R_xAl_yO_{12}$, and $R_xGa_yO_{12}$. A is one or more elements selected from a group consisting of Ca, Sr, and Ba, and R is one or more elements selected from a group consisting of rare earth elements. a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1. The ceramic particle includes a pore and the porosity of the ceramic particle is equal to or greater than 20% and equal to or less than 40%.

11 Claims, 4 Drawing Sheets

(51) Int. Cl.
*C09D 7/40* (2018.01)
*C08K 3/22* (2006.01)

(56) References Cited

U.S. PATENT DOCUMENTS

| | | |
|---|---|---|
| 10,908,078 B2 * | 2/2021 | Shibuya .................. E21D 11/00 |
| 2013/0177772 A1 | 7/2013 | Schaeffer et al. |
| 2013/0202895 A1 | 8/2013 | Arfsten et al. |
| 2017/0253797 A1 | 9/2017 | Shibuya |

FOREIGN PATENT DOCUMENTS

| | | | |
|---|---|---|---|
| JP | 2001-158660 A | | 6/2001 |
| JP | 2002-537537 A | | 11/2002 |
| JP | 2004-117249 A | | 4/2004 |
| JP | 2013-139565 A | | 7/2013 |
| JP | 2013-533909 A | | 8/2013 |
| JP | 2016204563 A | * | 12/2016 |
| WO | 2016/042749 A1 | | 3/2016 |

* cited by examiner

COATING MATERIAL AND SOLIDIFIED BODY OF COATING MATERIAL

CROSS REFERENCE TO RELATED APPLICATIONS

This Application is a National Stage of International Application No. PCT/JP2017/037779 filed Oct. 19, 2017, claiming priority based on Japanese Patent Application No. 2016-237666 filed Dec. 7, 2016, the content of which is incorporated herein in its entirety.

TECHNICAL FIELD

The present invention relates to a coating material and solidified body of a coating material.

BACKGROUND ART

When a specific object is to be detected using an infrared sensor, and infrared ray radiation of a portion to be a background is large, detection of the object might be difficult.

Patent Document 1 relates to a technology detecting an occupant inside a vehicle by using an infrared sensor. In the technology of Patent Document 1, when an infrared ray camera is installed at a position where the background region is window glass in a field of view, a window glass with a constant emissivity is set as the background region and it is easy to separate the occupant and the background.

RELATED DOCUMENT

Patent Document

[Patent Document 1] Japanese Unexamined Patent Publication No. 2004-117249

SUMMARY OF THE INVENTION

Technical Problem

Unfortunately, the technology of Patent Document 1 could not reduce infrared ray radiation of a background. For example, in Patent Document 1, the window glass had a high emissivity of 0.94.

The present invention has been made in view of the above problems. An object of the present invention is to provide a coating material which can form a face having a low radiation of an infrared ray by application.

Solution to Problem

A coating material according to the present invention includes a ceramic particle and a binder, in which the ceramic particle includes a compound represented by a compositional formula of any of $A_aR_bAl_cO_4$, $A_aR_bGa_cO_4$, $R_xAl_yO_{12}$, and $R_xGa_yO_{12}$, where A is one or more elements selected from a group consisting of Ca, Sr, and Ba, R is one or more elements selected from a group consisting of rare earth elements, a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1, the ceramic particle includes a pore, and a porosity of the ceramic particle is equal to or greater than 20% and equal to or less than 40%.

Advantageous Effects of Invention

The present invention has been made in view of the above problems. An object of the present invention is to provide a coating material which reduces radiation of an infrared ray in a specific wavelength by application.

BRIEF DESCRIPTION OF THE DRAWINGS

The objects described above, other objects, features, and advantages will become more apparent from the description of the following preferred example embodiments and accompanying drawings.

EXAMPLE EMBODIMENT

Hereinafter, example embodiments of the present invention will be described using drawings. Note that, in all the drawings, similar components are denoted by the same reference numerals, and a description thereof will not be repeated.

Figure 1:
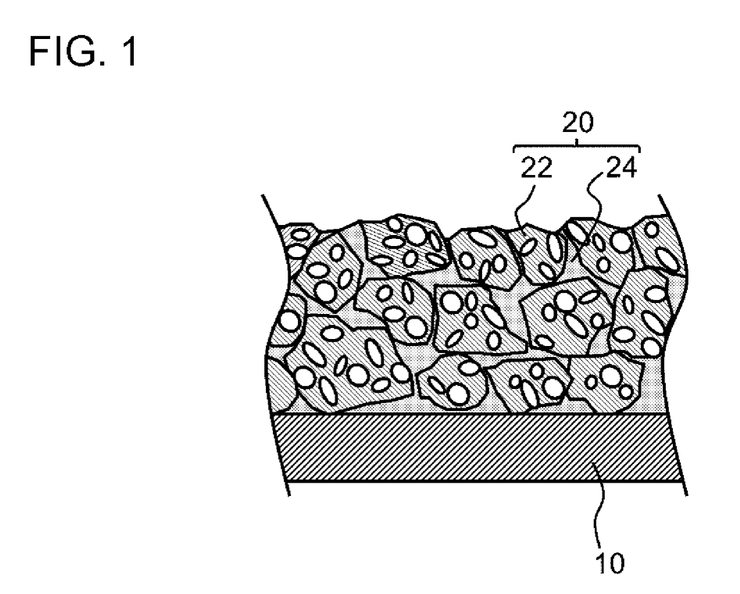
FIG. 1 is a sectional diagram illustrating a coating material applied on a base material.

FIG. 1 is a sectional diagram illustrating a coating material 20 applied on a base material 10. The coating material 20 according to the present example embodiment includes a ceramic particle 22 and a binder 24. The ceramic particle 22 includes a compound represented by a compositional formula of any of $A_aR_bAl_cO_4$, $A_aR_bGa_cO_4$, $R_xAl_yO_{12}$, and $R_xGa_yO_{12}$. Here, A is one or more elements selected from a group consisting of Ca, Sr, and Ba, and R is one or more elements selected from a group consisting of rare earth elements. a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1. The ceramic particle includes a pore and the porosity of the ceramic particle 22 is equal to or greater than 20% and equal to or less than 40%. Hereinafter, a description will be given in detail.

Ceramics have characteristics that emissivity is small in a specific wavelength region. However, since the ceramics also have transparency, there was a problem that the radiation of a material present on a back side of the ceramics is transmitted. The ceramic particle 22 included in the coating material 20 according to the present example embodiment has a characteristic that spectral emissivity or transmittance of light at a specific wavelength of an infrared band is small. Specifically, a porosity of the ceramic particle 22 is equal to or greater than 20%. Accordingly, infrared rays can be scattered before the light is transmitted. Therefore, the infrared ray transmission is small. Therefore, a surface coated with the coating material 20 has less emission of the infrared rays at a specific wavelength. In detection using an infrared sensor or an infrared ray camera, when such a face is used as a background, a contrast to an object to be detected can be enhanced, and detection accuracy can be improved.

Figure 2:
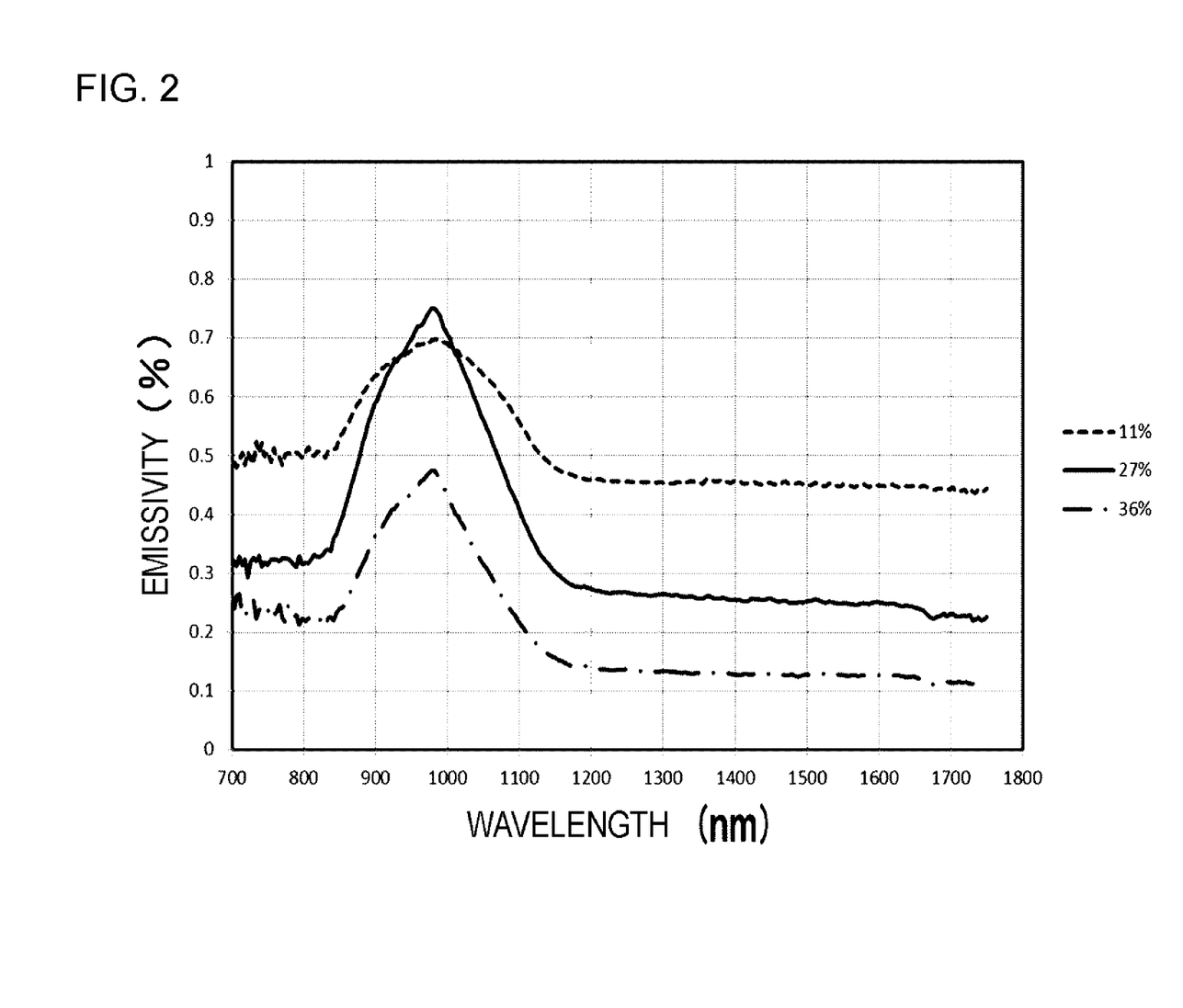
FIG. 2 is a spectrum of emissivity of $CaYbAlO_4$.

FIG. 2 is a spectrum of emissivity of CaYbAlO$_4$. It is a result of measuring a pellet of CaYbAlO$_4$ polycrystal which has K$_2$NiF$_4$ structure, in each of cases where the porosity is 11%, 27%, and 36%. An average value of temperatures of an obverse surface and a back face of the pellet was 1027° C. at 11% of porosity, 1127° C. at porosity of 27%, and 1062.5° C. at porosity of 36%. In addition, SiC ceramics as a heat source was installed on the back face of the pellet to perform measuring. The SiC is a gray body with an emissivity of approximately 0.9. Here, the emissivity was calculated by regarding the component which was radiated from the SiC and transmitted through the pellet as being also radiated from the pellet. As can be seen from the drawing, each spectrum has a peak corresponding to $^2F_{5/2} \rightarrow {}^2F_{7/2}$ transition of 4f electron of Yb$^{3+}$ in a wavelength range of equal to or greater than 800 nm and equal to or less than 1200 nm. In the pellet having the porosity equal to or greater than 20% and equal to or less than 40%, the emissivity of the wavelength band of equal to or greater than 1200 nm and equal to or less than 1700 nm is particularly low. In this wavelength band, since the emission from the SiC is strong, it is important to lower the transmittance of the ceramic. As long as the porosity is maintained, there is no limitation to the pellet, and even in a particulate polycrystal, the same characteristics are exhibited.

Figure 3:
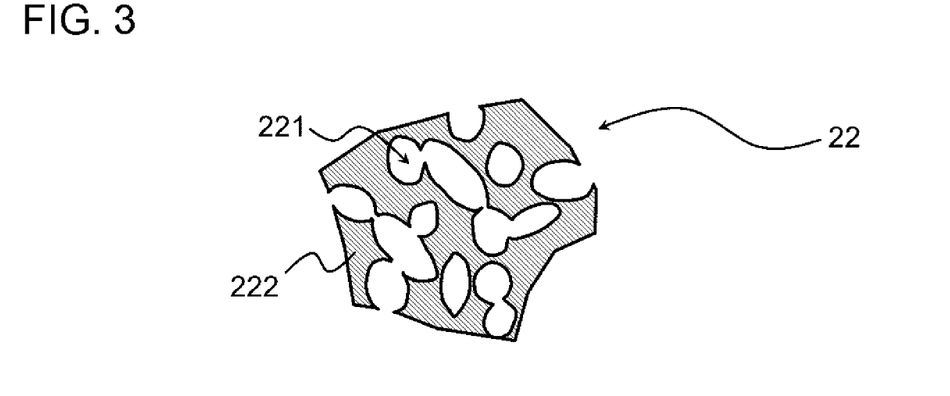
FIG. 3 is an enlarged sectional diagram illustrating an example of a structure of a ceramic particle.

FIG. 3 is an enlarged sectional diagram illustrating an example of a structure of the ceramic particle 22. The ceramic particle 22 has a pore 221 and a dense portion 222. The dense portion 222 includes a sintered body of ceramic crystals, and the pore 221 is formed in a gap of the ceramic crystals. That is, it can be said that the ceramic particle 22 is a polycrystalline sintered body. For example, the pore 221 includes a part that is connected in an inside of the ceramic particle 22 but is not linearly continuous. A size of the pore 221 of the ceramic particle 22 is not particularly limited. However, for example, a sectional area of the pore 221 is equal to or less than 5 μm$^2$. The sectional area of the pore 221 can be confirmed, for example, by observing a section of the ceramic particle 22 with an electron microscope.

As described above, the porosity of the ceramic particle 22 is equal to or greater than 20% and equal to or less than 40%. When setting the porosity of the ceramic particle 22 to be equal to or greater than 20%, the emission of the infrared ray due to the transmission of radiation from the base material 10 can be sufficiently reduced. In addition, when setting the porosity of the ceramic particle 22 to be equal to or less than 40%, it is possible to maintain the strength of the ceramic particle 22 and to maintain the radiation of R$^{3+}$. The porosity of the ceramic particle 22 is more preferably equal to or greater than 25% and equal to or less than 40%, and still more preferably equal to or greater than 30% and equal to or less than 35%.

The "porosity" of the ceramic particle 22 is a ratio of the total volume of the gap existing in the ceramic particle 22 to the total volume of the ceramic particle 22. The porosity is calculated using the following expression.

Porosity=1−(Actual density of ceramic/Theoretical density of ceramic)

Here, measurement of the porosity of the ceramic particle 22 can be performed, for example, as follows.

First, a resin is applied to the surface of the ceramic particles 22 and dried, and a weight in the air is measured. Next, the ceramic particle 22 to which the resin applied is placed in a liquid and a weight in the liquid is measured. Using these, the actual density of the ceramic particle 22 is measured.

In addition, the theoretical density is obtained from the weight, a crystal structure, and a volume of the ceramic particle 22 by calculation. The theoretical density of the ceramic particle 22 is a theoretical density in a case of assuming that there is no pore in the ceramic particle 22. Using the above actual density and the theoretical density, the porosity of the ceramic particle 22 can be obtained.

In this measurement, when applying a resin to the surface of the ceramic particles 22, it is possible to prevent liquid from entering the pore. The type of resin to be applied to the surface of the ceramic particle 22 is not particularly limited. However, since it is applied to the surface, it is preferable that the resin has low specific gravity and high viscosity. In addition, it is preferable not to react with the liquid used in the Archimedes method. As the resin, for example, an acrylic resin or a cellulose resin can be used.

As described above, the ceramic particle 22 includes a compound represented by a compositional formula of any of $A_aR_bAl_cO_4$, $A_aR_bGa_cO_4$, $R_xAl_yO_{12}$, and $R_xGa_yO_{12}$. This compound is, for example, a crystal. Among these, the crystal represented by the composition of $A_aR_bAl_cO_4$ or $A_aR_bGa_cO_4$ has, for example, a K$_2$NiF$_4$ structure. In addition, the crystal represented by the composition of $R_xAl_yO_{12}$ or $R_xGa_yO_{12}$ has, for example, a garnet structure. In particular, it is preferable that the main component of the ceramic particle 22 is the compound. For example, it is preferable that, in the ceramic particle 22, a content rate of the compound represented by the compositional formula of any of $A_aR_bAl_cO_4$, $A_aR_bGa_cO_4$, $R_xAl_yO_{12}$, and $R_xGa_yO_{12}$ is equal to or greater than 75% by weight.

In the compositional formula, A is one or more elements selected from a group consisting of Ca, Sr, and Ba, and R is one or more elements selected from a group consisting of rare earth elements. Among these, R can be, for example, a lanthanoid. The lanthanoid is, for example, one or more selected from a group consisting of Pr, Nd, Sm, Eu, Tb, Dy, Ho, Er, Tm, and Yb. Radiation of lanthanoid ions can be used, for example, for calibrating a sensor or a camera. In addition, when using Yb of the lanthanoid as R, radiation in other near-infrared regions can be reduced while showing radiation of Yb$^{3+}$ ions.

The ceramic particle 22 can be manufactured, for example, as follows. A plurality of materials containing an element contained in the ceramic particle 22, for example, oxides are prepared and weighed in a stoichiometric ratio to obtain crystals of any of the above composition formulas. However, from the viewpoint of stability in the air, a carbonate is preferably used as a material containing an element of alkaline earth metal. Since the carbonate of the alkaline earth metal may be weighed based on the stoichiometric ratio of the alkaline earth metal, since it changes into an oxide at the time of firing in the air.

Then, the materials are mixed and fired to obtain a polycrystal. Thereafter, the polycrystal is ground to obtain a primary particle. Further, the primary particle is press formed, for example, fired again to obtain a pellet. The pellet is coarsely crushed to obtain the ceramic particle 22.

It is preferable that the primary particle obtained by grinding the polycrystal has a large particle size. In this manner, a gap is easily formed between the primary particles, and a large pore can be formed. In addition, it is preferable that the primary particles have a large particle size variation. When including particles having small particle sizes, the primary particles are easily connected to each other. Therefore, sintering becomes easier. On the other hand, in a case where the particle size variation of the primary particles is small and the particle sizes are large, sintering at high temperature or for a long time is required. In consideration of a balance between the porosity and the sintering time, it is preferable that a proportion of particles having a large particle size is greater than the proportion of particles having a small particle size.

In addition, the porosity of the ceramic particles 22 can be adjusted by adjusting, for example, the particle size of the primary particles, the pressure in press forming, the firing temperature at the time of pellet formation, and the like. For example, in a case where the compound contained in the ceramic particle 22 is represented by the compositional formula $A_aR_bAl_cO_4$, the sintering temperature at the time of pellet formation is preferably equal to or greater than 1350° C. and equal to or less than 1400° C. In addition, in a case where the compound contained in the ceramic particle 22 is represented by the compositional formula $A_aR_bGa_cO_4$, the sintering temperature at the time of pellet formation is preferably equal to or greater than 1250° C. and equal to or less than 1300° C. When setting the sintering temperature to be equal to or greater than the lower limit, sintering time can be kept short and costs can be reduced. When setting the sintering temperature to be equal to or less than the upper limit, a sintered body having suitable porosity can be stably obtained without lowering of the porosity or melting of the fired body.

The particle size of the ceramic particle 22 is not particularly limited. However, it is preferable that the maximum peak in a particle size distribution curve of the ceramic particles 22 is located within a range of equal to or greater than 5 μm and equal to or less than 100 μm. According to this, the ceramic particles 22 are more easily fixed to the base material 10, and the ceramic particle 22 can be caused to have appropriate porosity. The maximum peak in the particle size distribution curve of the ceramic particles 22 is more preferably located within the range of equal to or greater than 10 μm and equal to or less than 60 μm, and more preferably located within the range of equal to or greater than 20 μm and equal to or less than 50 μm.

In addition, it is preferable that a content rate of the ceramic particle 22 relative to the solidified body of the coating material 20 is equal to or greater than 75% by weight and equal to or less than 92% by weight. According to this, the ceramic particles 22 are sufficiently combined with each other by the binder 24, and the infrared ray from the base material 10 can be sufficiently shielded by the ceramic particles 22. The content rate of the ceramic particle 22 relative to the solidified body of the coating material 20 can be determined, for example, by heating the solidified body of the coating material 20 at a high temperature, incinerating components such as binder 24, and then calculating the weight ratio before and after the incinerating.

The binder 24 bonds the ceramic particles 22 to each other in the solidified body of the coating material 20. For example, the binder 24 includes a resin. In order to maintain low emissivity and transmittance of light in the infrared band of the ceramic particle 22, in the coating material 20 and the solidified body of the coating material 20, it is preferable that the binder 24 does not enter the pore 221 of the ceramic particle 22. However, a state of the binder 24 is not particularly limited. The binder 24 may enter at least a part of the pore 221 of the ceramic particle 22 in at least one of the coating material 20 and the solidified body of the coating material 20. In addition, a refractive index of the binder 24 is preferably equal to or greater than 1.0 and equal to or less than 1.4. If the refractive index of the binder 24 is equal to or greater than 1.0 and equal to or less than 1.4, even in a case where the binder 24 enters the pore 221, an influence on the light transmission suppression effect of the ceramic particle 22 in an infrared band is small.

Examples of the binder 24 include a fluororesin. Among them, it is preferable that the binder 24 contains an amorphous fluororesin. It is more preferable that the binder 24 is the amorphous fluororesin. According to this, the refractive index of the binder 24 can be lowered.

The light absorptance of the binder 24 is preferably equal to or less than 0.1, in the wavelength range of equal to or greater than 1200 nm and equal to or less than 1700 nm. Since the absorptance and emissivity of a substance become equal, when setting the absorptance in the wavelength range of equal to or greater than 1200 nm and equal to or less than 1700 nm to be equal to or less than 0.1, the emissivity of the infrared ray of the binder 24 can be lowered. As a result, the radiation of the infrared ray of the coating material 20 can be reduced.

The coating material 20 may also contain a pigment, a solvent, a plasticizer, a dispersing agent, a thickener, and other additives, in addition to the ceramic particles 22 and the binder 24. The total content of these additives is, for example, equal to or less than 5% by weight relative to the solidified body of the coating material 20.

The coating material 20 can be obtained by mixing the ceramic particle 22 and the binder 24, and as needed, other components.

The coating material 20 can be used by being applied to the surface of the base material 10. The base material 10 is not particularly limited, and is a wall, a road surface, a ceiling, a floor, a signboard, a mark, and the like. The base material 10 is covered with the solidified body of the coating material 20 by solidifying or curing of the binder 24. According to this, for example, in the infrared ray detection image in which the base material 10 was used as a background, it becomes easy to perform person monitoring or the like.

Next, an operation and an effect of the present example embodiment will be described. According to the coating material 20 according to the present example embodiment, the ceramic particle 22 emits less infrared rays. In addition, the infrared ray from the base material 10 can also be obstructed by scattering (reflection) of the ceramic particle 22. Therefore, a surface coated with the coating material 20 has less emission of the infrared rays. In detection using an infrared sensor or an infrared ray camera, when such a face is used as a background, a contrast to an object to be detected can be enhanced, and detection accuracy can be improved.

EXAMPLE

Hereinafter, the present example embodiment will be described in detail with reference to Examples as below. The present example embodiment is not limited to the description of these Examples.

As described in the example embodiment, primary particles were formed to obtain a pellet.

Figure 4:
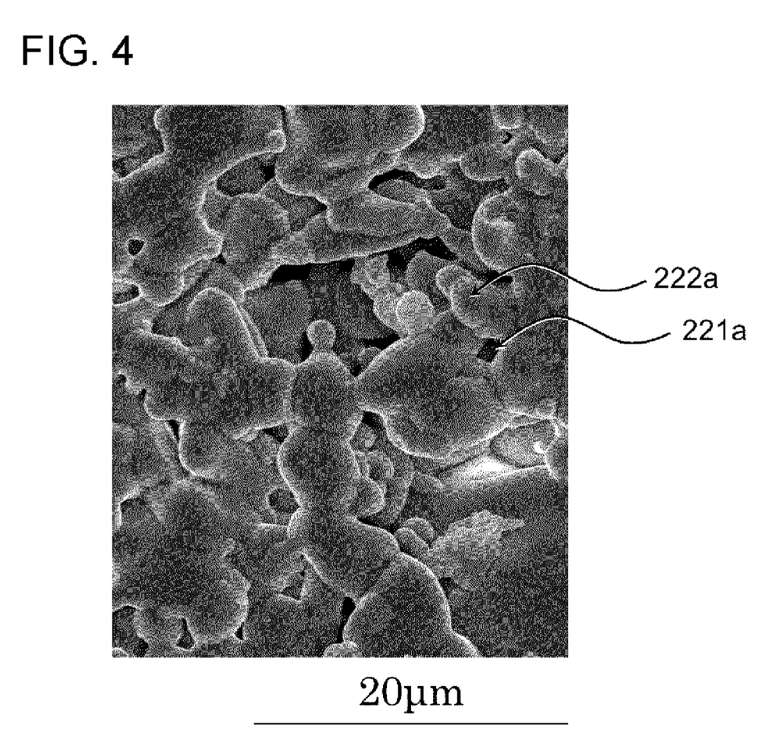
FIG. 4 is a view showing a result of observation of a surface of a pellet by a scanning electron microscope.

FIG. 4 is a view showing a result of observation of a surface of the pellet by a scanning electron microscope. The drawing shows an observation result of the pellet which was prepared by using the primary particles having a composition of $YbCaAlO_4$. From the drawing, it can be seen that the pellet has a primary particle 222a and a pore 221a. The pore 221a is the pore 221 in the ceramic particle 22 of the example embodiment. In addition, the primary particles 222a configure the dense portion 222 in the ceramic particle 22 of the example embodiment.

This pellet was ground to obtain ceramic particles and mixed with a binder to prepare a coating material as described in the example embodiment. The porosity of the ceramic particle was within a range of equal to or greater than 20% and equal to or less than 40%. This coating material was applied to a base material and photographed with an infrared ray camera. As a result, the detected infrared ray intensity was less than that of a case where the coating material was not applied.

Hereinabove, although the example embodiment of the present invention has been described with reference to the drawings, these are examples of the present invention, and various configurations other than the above can be adopted.

A part or all of the example embodiment may also be described as in the following appendices, but are not limited to the following.

1-1. A coating material comprising:
a ceramic particle; and
a binder,
wherein the ceramic particle comprises a compound represented by a compositional formula of any of $A_aR_bAl_cO_4$, $A_aR_bGa_cO_4$, $R_xAl_yO_{12}$, and $R_xGa_yO_{12}$,
A is one or more elements selected from a group consisting of Ca, Sr, and Ba,
R is one or more elements selected from a group consisting of rare earth elements,
a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1,
the ceramic particle comprises a pore, and
a porosity of the ceramic particle is equal to or greater than 20% and equal to or less than 40%.

1-2. The coating material according to 1-1,
wherein a maximum peak in a particle size distribution curve of the ceramic particles is located within a range of equal to or greater than 5 μm and equal to or less than 100 μm.

1-3. The coating material according to 1-1 or 1-2,
wherein a content rate of the ceramic particle relative to solidified body of the coating material is equal to or greater than 75% by weight and equal to or less than 92% by weight.

1-4. The coating material according to any one of 1-1 to 1-3,
wherein a refractive index of the binder is equal to or greater than 1.0 and equal to or less than 1.4.

1-5. The coating material according to any one of 1-1 to 1-4,
wherein a light absorptance of the binder is equal to or less than 0.1 in a wavelength range of equal to or greater than 1200 nm and equal to or less than 1700 nm.

1-6. The coating material according to any one of 1-1 to 1-5,
wherein the binder comprises a resin.

1-7. The coating material according to 1-6,
wherein the binder comprises an amorphous fluororesin.

1-8. The coating material according to any one of 1-1 to 1-7,
wherein a content rate of the compound in the ceramic particle is equal to or greater than 75% by weight.

1-9. The coating material according to any one of 1-1 to 1-8,
wherein R is Yb.

1-10. The coating material according to any one of 1-1 to 1-9,
wherein the ceramic particle is a polycrystalline sintered body.

1-11. The coating material according to any one of 1-1 to 1-10,
wherein the pore comprises a part that is connected in an inside of the ceramic particle but is not linearly continuous.

1-12. Solidified body of the coating material according to any one of 1-1 to 1-11.

2-1. Solidified body of a coating material,
wherein the coating material comprises a ceramic particle and a binder,
the ceramic particle comprises a compound represented by a compositional formula of any of $A_aR_bAl_cO_4$, $A_aR_bGa_cO_4$, $R_xAl_yO_{12}$, and $R_xGa_yO_{12}$,
A is one or more elements selected from a group consisting of Ca, Sr, and Ba,
R is one or more elements selected from a group consisting of rare earth elements,
a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1,
the ceramic particle comprises a pore, and
a porosity of the ceramic particle is equal to or greater than 20% and equal to or less than 40%.

2-2. The solidified body of a coating material according to 2-1,
wherein a maximum peak in a particle size distribution curve of the ceramic particles is located within a range of equal to or greater than 5 μm and equal to or less than 100 μm.

2-3. The solidified body of a coating material according to 2-1 or 2-2,
wherein a content rate of the ceramic particle relative to the solidified body of the coating material is equal to or greater than 75% by weight and equal to or less than 92% by weight.

2-4. The solidified body of a coating material according to any one of 2-1 to 2-3,
wherein a refractive index of the binder is equal to or greater than 1.0 and equal to or less than 1.4.

2-5. The solidified body of a coating material according to any one of 2-1 to 2-4,
wherein a light absorptance of the binder is equal to or less than 0.1 in a wavelength range of equal to or greater than 1200 nm and equal to or less than 1700 nm.

2-6. The solidified body of a coating material according to any one of 2-1 to 2-5,
wherein the binder comprises a resin.

2-7. The solidified body of a coating material according to 2-6,
wherein the binder comprises an amorphous fluororesin.

2-8. The solidified body of a coating material according to any one of 2-1 to 2-7,
wherein a content rate of the compound in the ceramic particle is equal to or greater than 75% by weight.

2-9. The solidified body of a coating material according to any one of 2-1 to 2-8,
wherein R is Yb.

2-10. The solidified body of a coating material according to any one of 2-1 to 2-9,
wherein the ceramic particle is a polycrystalline sintered body.

2-11. The solidified body of a coating material according to any one of 2-1 to 2-10, wherein the pore comprises a part that is connected in an inside of the ceramic particle but is not linearly continuous.

The invention claimed is:

1. A coating material comprising:
   a ceramic particle; and
   a binder,
   wherein the ceramic particle comprises a compound represented by a compositional formula of any of $A_aR_bAl_cO_4$, $A_aR_bGa_cO_4$, $R_xAl_yO_{12}$, and $R_xGa_yO_{12}$,
   A is one or more elements selected from a group consisting of Ca, Sr, and Ba,
   R is one or more elements selected from a group consisting of rare earth elements, and
   a is equal to or greater than 0.9 and equal to or less than 1.1, b is equal to or greater than 0.9 and equal to or less than 1.1, c is equal to or greater than 0.9 and equal to or less than 1.1, x is equal to or greater than 2.9 and equal to or less than 3.1, and y is equal to or greater than 4.9 and equal to or less than 5.1,
   the ceramic particle comprises a pore,
   a porosity of the ceramic particle is equal to or greater than 20% and equal to or less than 40%, and
   the binder comprises a resin.

2. The coating material according to claim 1,
   wherein a maximum peak in a particle size distribution curve of the ceramic particles is located within a range of equal to or greater than 5 μm and equal to or less than 100 μm.

3. The coating material according to claim 1,
   wherein a content rate of the ceramic particle relative to solidified body of the coating material is equal to or greater than 75% by weight and equal to or less than 92% by weight.

4. The coating material according to claim 1,
   wherein a refractive index of the binder is equal to or greater than 1.0 and equal to or less than 1.4.

5. The coating material according to claim 1,
   wherein a light absorptance of the binder is equal to or less than 0.1 in a wavelength range of equal to or greater than 1200 nm and equal to or less than 1700 nm.

6. The coating material according to claim 1,
   wherein the binder comprises an amorphous fluororesin.

7. The coating material according to claim 1,
   wherein a content rate of the compound in the ceramic particle is equal to or greater than 75% by weight.

8. The coating material according to claim 1,
   wherein R is Yb.

9. The coating material according to claim 1,
   wherein the ceramic particle is a polycrystalline sintered body.

10. The coating material according to claim 1,
    wherein the pore comprises a part that is connected in an inside of the ceramic particle but is not linearly continuous.

11. Solidified body of the coating material according to claim 1.

* * * * *